(12) United States Patent
Aamodt et al.

(10) Patent No.: US 6,805,719 B2
(45) Date of Patent: Oct. 19, 2004

(54) BALANCED ANODE ELECTRODE

(75) Inventors: Paul B. Aamodt, Richfield, MN (US); Karl Hokanson, Coon Rapids, MN (US); Sonja K. Somdahl, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 212 days.

(21) Appl. No.: 10/123,495

(22) Filed: Apr. 15, 2002

(65) Prior Publication Data

US 2003/0194604 A1 Oct. 16, 2003

(51) Int. Cl.[7] .......................... H01M 6/00; H01M 4/00; H01M 4/02; H01M 4/58; H01M 4/72
(52) U.S. Cl. ...................... 29/623.1; 429/128; 429/209; 429/231.95; 429/211; 429/233
(58) Field of Search ................................ 429/128, 209, 429/231.9, 231.95, 211, 233, 94; 29/623.1

(56) References Cited

U.S. PATENT DOCUMENTS

| | | | |
|---|---|---|---|
| 5,458,997 A | 10/1995 | Crespi et al. ............... 429/219 |
| 5,486,215 A | 1/1996 | Kelm et al. ................. 29/623.1 |
| 6,051,038 A | 4/2000 | Howard et al. ............ 29/623.1 |
| 6,383,680 B1 * | 5/2002 | Hallifax et al. ............... 429/94 |

* cited by examiner

Primary Examiner—Patrick Ryan
Assistant Examiner—Thomas H. Parsons
(74) Attorney, Agent, or Firm—Girma Wolde-Michael; Paul H. McDowall

(57) ABSTRACT

An anode-limited battery and method of assembly are provided in which a lithium anode subassembly is constructed from two pieces of lithium foil. An elongated thicker piece of lithium foil is cohesively bonded at one end to a shorter, thinner piece of lithium foil. An optional current collector stabilizes the area of the cohesive bond. The thicker lithium foil forms the inner windings of a coiled electrode, which face reactive cathode material on both sides. The thinner foil forms the outermost winding, which faces reactive cathode material on only one side. Thus, an appropriate amount of lithium is available for cathode discharge. The method of electrode assembly allows a narrow tolerance of the lithium anode such that the benefits of an anode-limited cell may be realized.

19 Claims, 6 Drawing Sheets

BALANCED ANODE ELECTRODE

FIELD OF THE INVENTION

The present invention relates to an electrochemical cell and, more specifically, to an anode-limited balanced cell that is particularly useful in implantable medical devices such as cardiac defibrillators.

BACKGROUND OF THE INVENTION

Implantable cardiac defibrillators are used to treat patients suffering from ventricular fibrillation, a chaotic heart rhythm that can quickly result in death if not corrected. In operation, the defibrillator device continuously monitors the electrical activity of the heart of the patient, detects ventricular fibrillation, and in response to that detection, delivers appropriate shocks to restore a normal heart rhythm. Shocks as large as 30–35 Joules may be needed. Shocks are delivered from capacitors capable of providing that energy to the patient in a fraction of a second. In order to provide timely therapy to the patient after the detection of ventricular fibrillation, it is necessary to charge the capacitors with the required amount of energy within only a few seconds. Thus, the defibrillator power source must have a high rate capability to provide the necessary charge to the capacitors. It must also possess low self-discharge in order to have a useful life of many months, and it must be highly reliable to provide an urgently needed therapy whenever necessary. In addition, since cardiac defibrillators are implanted, the battery must be able to supply energy from a minimum packaged volume.

Batteries or cells are volumetrically constrained systems. The size or volume of components that go into a battery (cathode, anode, separator, current collectors, electrolyte, etc.) cannot exceed the available volume of the battery case. In addition, the appropriate amount of some components depends on the amount of other components that are used. These components must be "balanced" to provide discharge to the extent desired.

In a conventional cathode limited battery such as a lithium-silver vanadium oxide (LiSVO) battery commonly used in a defibrillator application, the capacity ($Q_+$) of the cathode must not exceed the capacity ($Q_-$) of the anode. Cathode limited cells have been used in battery powered implantable medical devices such as heart pacemakers because of the proven reliability of their discharge over the long periods during which they are implanted. The volume occupied by the other battery components also depends on the cathode capacity ($Q_+$) as reflected by the amount of cathode material in the battery. The amount of electrolyte depends on the amount of cathode material and the amount of it to be discharged since the cathode material swells as the battery is discharged and requires more electrolyte to fill the additional cathode volume. The volume of the separator and current collector depends on the area of the electrodes. The area of the electrodes depends on the area required for consistent pulse output as the battery is discharged. All of these components must be adjusted for a given battery volume.

One method for constructing a lithium anode cell is to wind cathode and anode elements together to form a generally cylindrical or oblong coil. In a coiled design, anode material is available on either side of the cathode windings and will deplete into the cathode as the battery is discharged. Reliable performance is assured by having an excess of anode capacity beyond the usable capacity desired of the cathode. This excess lithium is distributed through the length of the anode. The lithium winding forming the outermost turn of the coil has cathode material adjacent to its inner circumference but not on the outer circumference. Therefore, the outermost turn of the anode need only be half the thickness of the inner turns. If an anode is constructed from a single piece of foil that is of uniform thickness, there is an additional excess of lithium on the outermost turn of the coil.

One limitation of a cathode-limited cell is that the excess lithium in the cell may reduce other materials after the cathode is fully discharged, which can lead to cell swelling. In order to prevent damage to circuitry surrounding the cell due to cell swelling, a reinforcing stainless steel plate is typically provided against the cell. This stainless steel plate occupies valuable space in an implantable device and adds weight to the overall device. In regard to implantable medical devices, a reduced size and weight is desirable to ease the implant procedure and avoid patient discomfort at the implant site. Eliminating the excess lithium or the need for the stainless steel plate would allow the cell size, and therefore the overall size of the medical device, to be reduced. Alternatively, the volume occupied by excess lithium and the steel plate could otherwise be taken up by cathode material to increase the battery capacity.

Another limitation of a cathode-limited cell is that its resistance increases as a function of time after the cell is discharged to the second voltage plateau on its discharge curve. By limiting the amount of lithium and electrolyte material in the cell, the cell may be designed to utilize only the first voltage plateau. Superior long-term cell performance can be achieved since the same useful capacity can be provided in a defibrillator application as in a conventionally balanced cell but at a higher voltage toward the end of the discharge cycle. The average capacitor charge time is shortened toward the end of the cell's useful life, maintaining a more constant charge time throughout the life of the defibrillator. A lithium-limited balanced cell having these advantages is disclosed in U.S. Pat. No. 5,458,997 to Crespi et al, incorporated herein by reference in its entirety.

A method for manufacturing an anode-limited cell is needed that eliminates the excess anode material associated with a conventional coiled electrode. A prior art method for assembling a lithium anode to provide a thinner outer winding in a coiled electrode involves layering two lithium foil pieces. One lithium foil is provided long enough to form all of the windings in a coil, and the other lithium foil is provided long enough to form only the inner windings. When the two foils are overlaid, with an optional current collector sandwiched between, and coiled with a cathode, the inner coil windings are formed by a double layer of lithium foil and the outermost winding by a single layer of lithium foil.

This method, however, has several limitations. One limitation is the difficulty in handling two, long, thin pieces of lithium foil during the manufacturing process. Another limitation is tolerance "stack-up". A given tolerance is associated with each dimension of manufactured lithium foil. When two layers of lithium foil are pressed together to form the length of the anode that becomes the inner windings of a coiled electrode, tolerance "stack-up" occurs, widening the total tolerance. For example, if the tolerance for each foil is ±10%, the total tolerance of the layered foils may be doubled to as much as ±20%. This wide tolerance may be unacceptable in an efficient anode-limited cell. Excess lithium takes up volume that could be devoted to further increasing the capacity of the cell or may lead to undesirable discharge characteristics and cell swelling. A lack of lithium could lead to premature battery depletion due to the cathode discharge becoming excessively limited by the amount of lithium available. Minimizing the tolerance of lithium and the total amount of excess lithium is important for at least two reasons: 1) the minimum amount of lithium, excluding the excess, must be maintained throughout the first voltage plateau to have reliable cell performance, and 2) the maximum amount of lithium including the excess must be consumed before the end of the second voltage plateau to avoid swelling.

Accordingly, a method for manufacturing a lithium anode is needed, therefore, that maintains a narrow tolerance of the lithium anode dimensions or mass such that the advantages of the discharge characteristics of an anode-limited cell may be realized.

SUMMARY OF THE INVENTION

The present invention addresses the problem of excess lithium in an electrochemical cell. One aspect of the present invention is a method for manufacturing an electrode assembly that allows a narrow tolerance of the anode material in order to achieve the improved discharge characteristics of an anode-limited cell. Other aspects of the present invention include providing an anode-limited cell with improved capacity or reduced overall size, avoiding premature battery depletion due to an insufficient amount of anode, and avoiding cell swelling.

These aspects of the invention are realized by providing an anode constructed from a thin piece of lithium foil joined at one end to a thicker piece of lithium foil such that the thin lithium foil forms the outermost winding of a coiled electrode and the thicker lithium foil forms the inner windings. The thicker foil forming the inner windings provides enough lithium for depleting into the cathode material facing both sides of the inner windings. The thinner foil forming the outermost winding provides enough lithium for depleting into the cathode material facing only the inner side of the outermost winding. The two lithium foils overlap each other to provide continuity, but this overlap is minimized to prevent an excess of lithium and reduce the amount of lithium required for construction. A metal grid functions as a current collector and advantageously stabilizes and reinforces the cohesive bond between the two lithium foils.

By using a thin lithium foil for the outermost turn, space is made available for additional cathode material such that the charge capacity of the anode-limited cell may be increased. Alternatively, the overall battery size may be reduced by limiting the amount of lithium. Moreover, cell swelling is avoided in a anode-limited cell, eliminating the need for a reinforcing steel plate, freeing even more space for cathode material or a reduction in the overall battery size.

Maintaining a narrow tolerance of the lithium anode dimensions is possible since the lithium anode primarily comprises a single layer of lithium foil with only a limited area of overlapping layers. Tolerance stack-up is avoided. Thus, the improved discharge characteristics of an anode-limited cell can be realized by implementing methods included in the present invention for assembling a lithium anode.

DETAILED DESCRIPTION OF THE INVENTION

As described above, the present invention is aimed at providing an anode-limited electrochemical cell manufactured using methods that allow a narrow lithium tolerance. The methods included in the present invention may be incorporated in any cell system in which accurate balancing of cell components is needed. The anode-limited battery and method of manufacture included in the present invention are particularly advantageous in implantable medical device applications such as pacemakers and defibrillators. Although a variety of battery configurations and constructions are possible for a lithium anode battery, the methods included in the present invention are particularly suited for batteries having folded, coiled or wrapped electrode configurations, such as the batteries disclosed in U.S. Pat. No. 5,486,215 issued to Kelm et al., and U.S. Pat. No. 6,051,038 issued to Howard et al, both patents incorporated herein by reference in their entirety.

Figure 1:
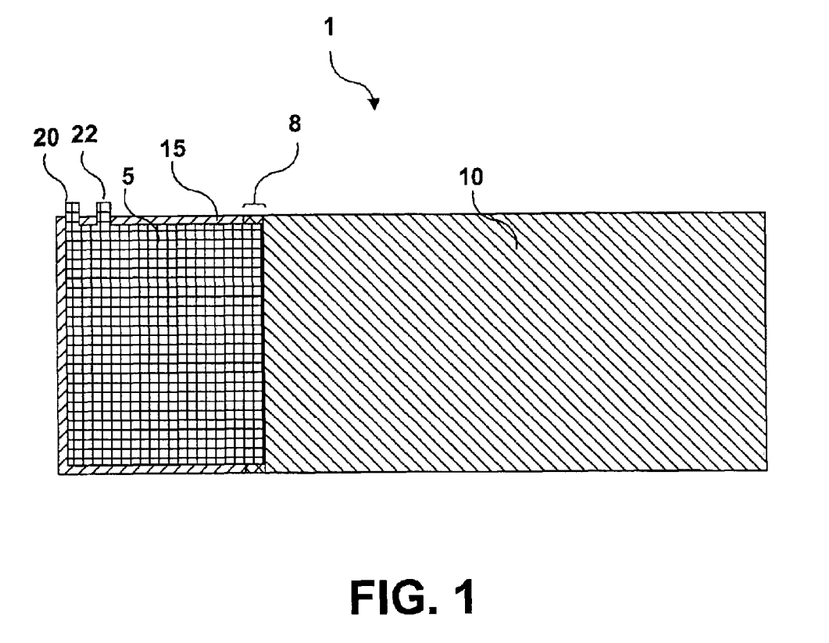
FIG. 1 is a plan view of a lithium anode to be used in an anode-limited cell according to a preferred embodiment of the present invention.

FIG. 1 shows an anode subassembly 1 to be included in a battery electrode assembly. The anode assembly 1 includes an elongated piece of alkali metal 10 conjoined to a shorter and thinner piece of alkali metal 15. The alkali metal pieces 10, 15 are preferably foils formed of lithium metal or an alloy of lithium. The two foil pieces 10 and 15 are partially overlapped to provide a cohesive bond between the two pieces 10, 15. The area of overlap 8 is preferably kept as narrow as possible to avoid excess lithium but still provide a stable cohesive bond.

The cohesive bond may be further stabilized and reinforced by a current collector 5. The current collector 5 may take the form of a grid or screen made from a conductive metal that is corrosion-resistant when associated with the alkali metal pieces 10 and 15. The current collector 5 is preferably fabricated from titanium, nickel, copper or an alloy of nickel or copper. One or more connector tabs may project from the current collector 5 to allow anode connection to a desired battery terminal. Two anode connector tabs 20 and 22 are shown in FIG. 1.

Figure 2:
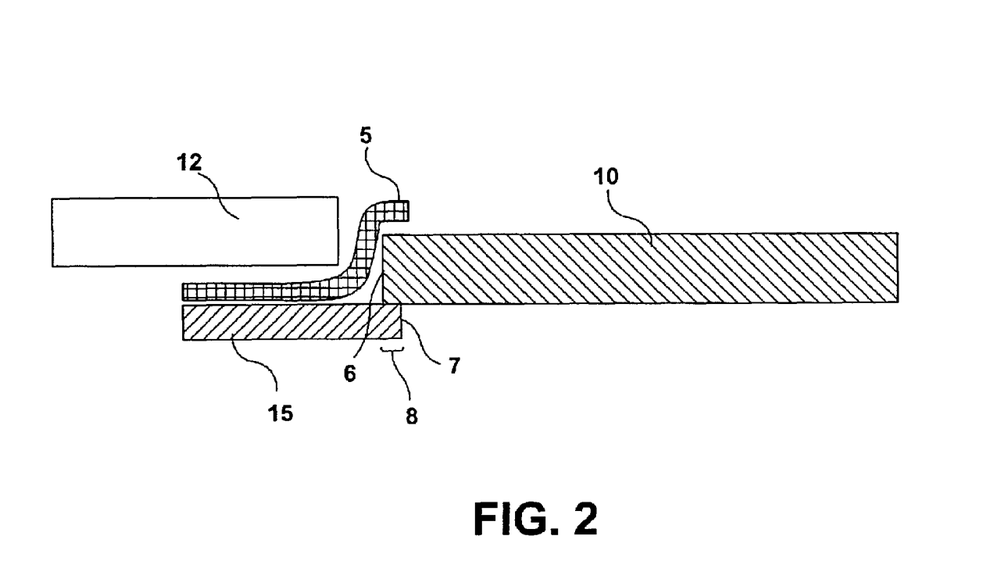
FIG. 2 is a side view of the lithium anode shown in FIG. 1 illustrating one method for assembly.

FIG. 2 illustrates one method for assembling the anode subassembly 1. The short edge 6 at one end of the elongated piece of alkali metal 10 is laid over a corresponding edge 7 of the thinner piece of alkali metal 15 such that a cohesive bond between the two pieces 10 and 15 exists in the area of overlap 8. The current collector 5 may then be laid over the thin piece of alkali metal 15 and the area of overlap 8 such that the elongated piece 10 is sandwiched between the thin piece 10 and the current collector 5 in the region of overlap 8. The collector 5 is then pressed against the alkali metal pieces 10 and 15. A shim 12 may be used during this process to aid in holding the collector 5 in a desired position when it is pressed against the alkali metal pieces 10 and 15. The current collector 5 thus reinforces the area of overlap 8 such that the cohesive bond area between the two alkali metal pieces 10 and 15 is supported and stabilized by the current collector 5.

Figure 3:
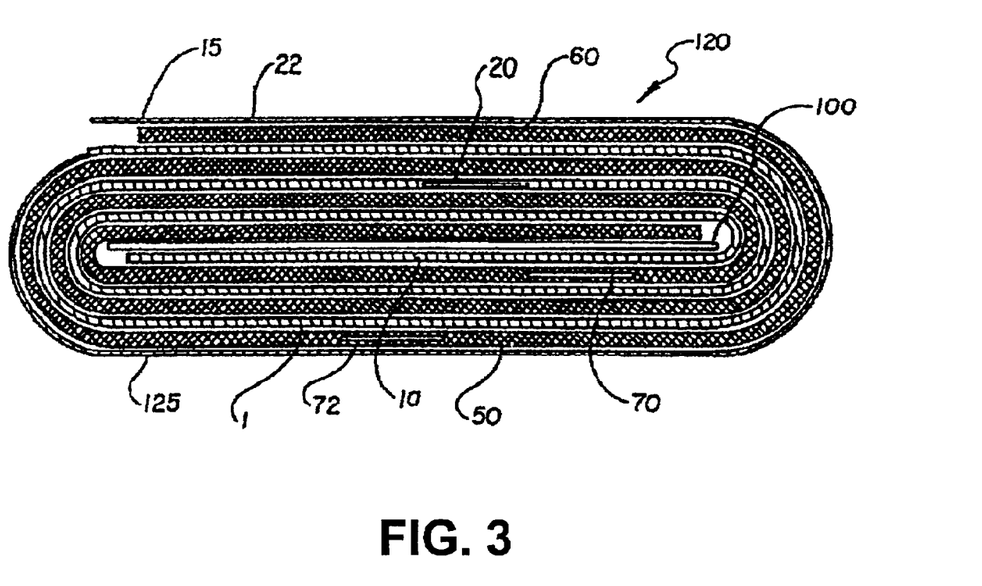
FIG. 3 is a top view of a coiled electrode assembly that includes the lithium anode shown in FIG. 1.

The anode subassembly 1 is wound with a cathode subassembly 50 to form the electrode assembly 120 shown in FIG. 3. The cathode subassembly 50 includes cathode material pressed against a current collector. The current collector is preferably formed from a conductive metal that is corrosion resistant at the cathode potential, such as titanium or aluminum. The current collector may be provided with one or more projecting connector tabs. In the embodiment shown in FIG. 3, two connector tabs 70 and 72 are shown. The cathode material includes a solid reactive cathode ingredient, such as silver vanadium oxide (SVO), and may include other materials such as binding materials or conductivity enhancers as desired. Both the cathode subassembly 50 and the anode subassembly 1 may be enveloped in a separator material, such as a commercially available microporous polyolefin material.

The cathode subassembly 50 and the anode subassembly 1 are wound around a mandrel 100. A method for winding the electrode assembly 120 may be performed as described in previously referenced U.S. Pat. No. 5,486,215 and U.S. Pat. No. 6,051,038. The length of the anode subassembly 1 relative to the cathode subassembly 50 is such that the outermost winding 125 of the electrode assembly 120 is formed by the anode subassembly 1. Moreover, the length of the elongated alkali metal piece 10 and the length of the shorter, thinner alkali metal piece 15 are such that the thicker piece 10 forms the inner windings of the electrode assembly 120 and the thinner piece 15 forms the outermost winding 125 of the assembly 120.

After the anode and cathode subassemblies 1 and 50 have been properly wound, the mandrel 100 may be removed. The inner windings formed by the thicker alkali metal piece 10 beginning at the innermost winding 1a face cathode material on both sides. The outermost winding 125 formed by the thinner alkali metal piece 15 faces cathode material 60 only on one side. By utilizing a thinner piece of metal alkali 15 for the outermost winding 125, additional excess lithium is eliminated.

The various methods, structures, and arrangements enable ease of manufacture and construction of the anode assembly. Previous methods for constructing a lithium anode involved layering two elongated thin pieces of lithium foil. In the present invention, the lithium anode is assembled by joining a relatively thick, long piece of lithium foil with a thin, short piece of lithium foil, both of which are comparably easier to handle than two long, thin pieces.

Moreover, the methods of the present invention avoid tolerance stack-up. In providing a anode-limited battery, narrow tolerance of the lithium anode is necessary. By providing an anode assembly method that uses only a single layer of lithium foil for both the inner windings and for the outermost winding, a narrower tolerance is maintained, making the implementation of an anode-limited cell feasible.

Figure 4:
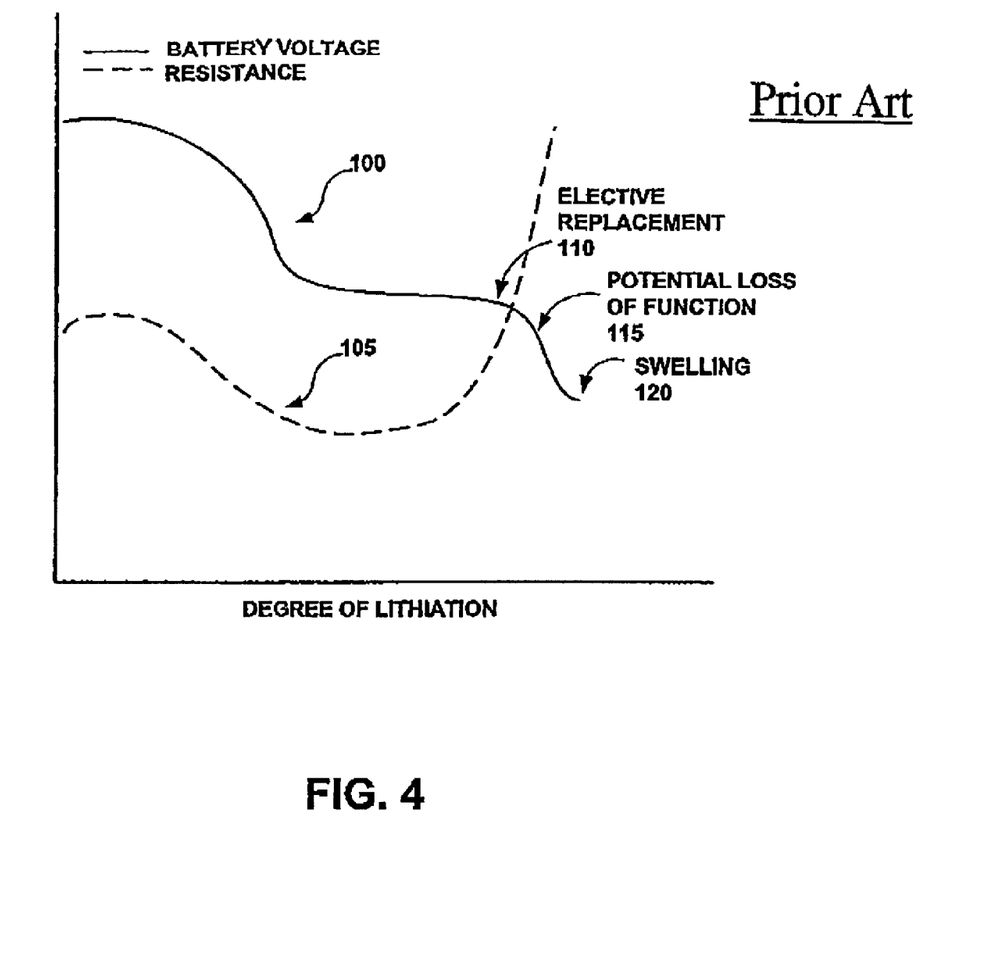
FIG. 4 is a graph illustrating the discharge characteristics of a conventional lithium anode battery.

The graph shown in FIG. 4 illustrates the performance of a conventional cathode-limited cell. The curve 100 represents the discharge characteristics as the lithium depletes into the cathode over time. The battery voltage as a function of the degree of lithiation is characterized by a first voltage plateau, followed by a decline to a second voltage plateau. After the second plateau, an elective replacement indicator 110 is reached after which the discharge curve becomes relatively steep. Subsequently, potential loss of function 115 and cell swelling 120 may soon occur. The battery resistance 105 typically increases steeply toward the end of the second plateau, compromising battery performance. In a defibrillator application, capacitor charge times will become considerably longer as the battery resistance increases.

Figure 5:
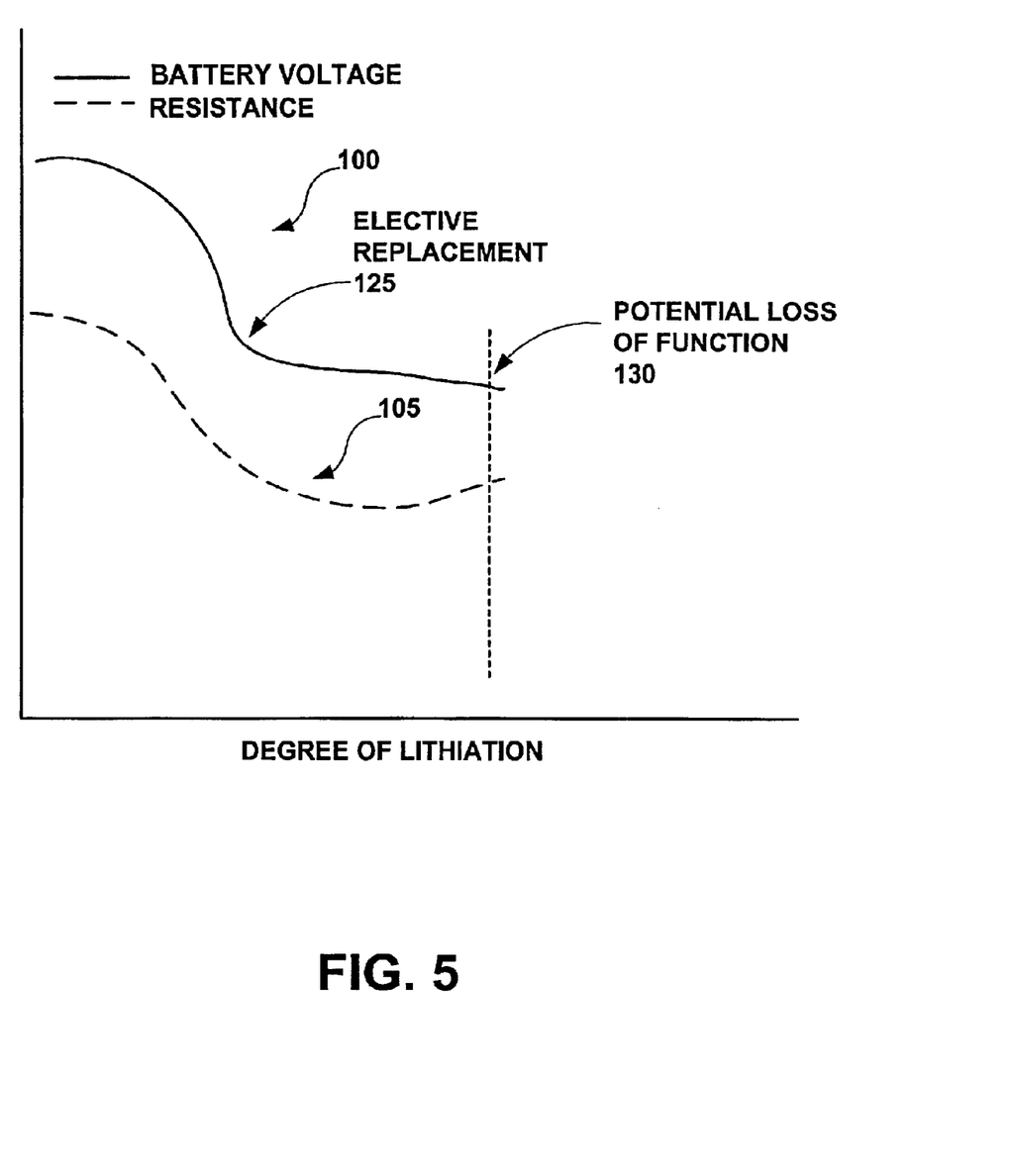
FIG. 5 is a graph illustrating the discharge characteristics of a lithium anode battery as modified by the present invention.

The graph shown in FIG. 5 illustrates the performance that may be achieved in an anode-limited cell made feasible by the methods included in the present invention. The battery is balanced such that the end of discharge is approximately the start of the second voltage plateau. Discharge is avoided in the region of increased resistance and potential swelling shown in the graph of FIG. 4. Since swelling is avoided, a reinforcing steel plate is unnecessary. Eliminating the steel plate and excess lithium frees up space for additional cathode material such that the first voltage plateau may be extended, increasing battery capacity and useful life-span.

Figure 6:
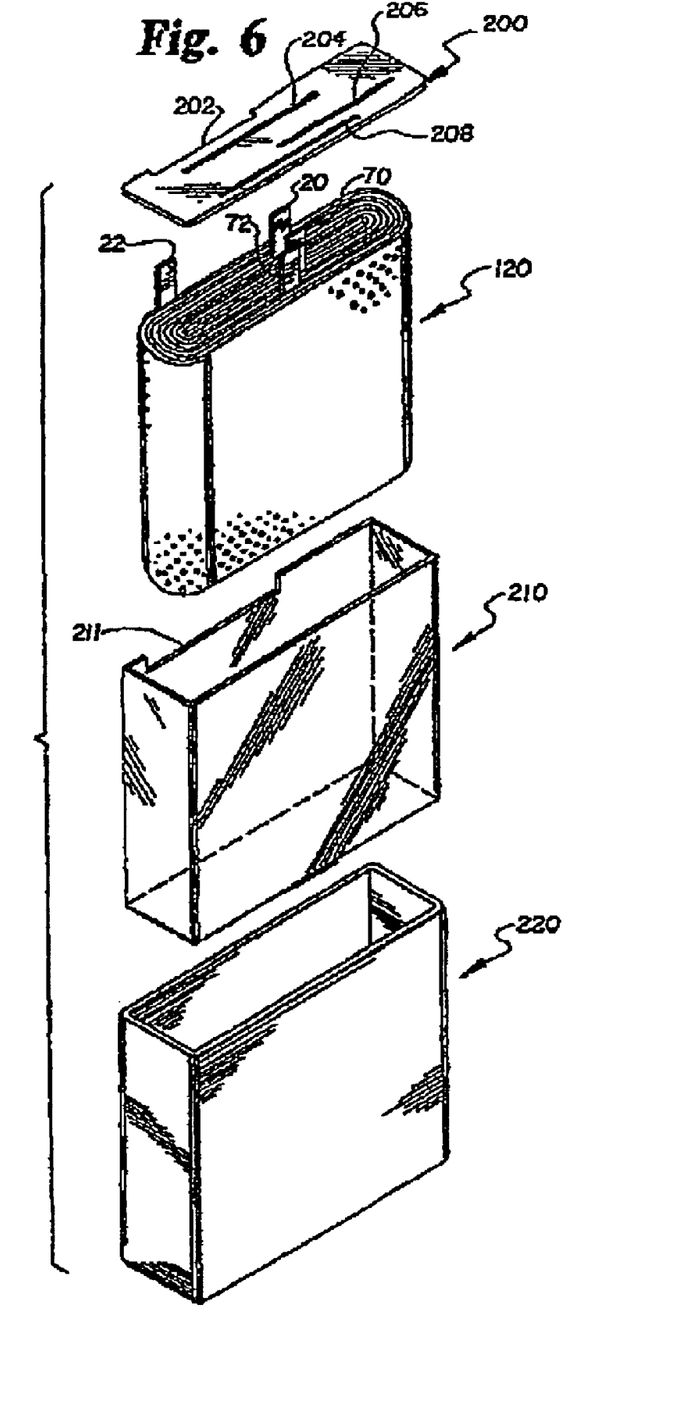
FIG. 6 is an exploded perspective view showing the insertion of the electrode assembly shown in FIG. 3 in a battery case together with insulator materials.
Figures 7, 8:
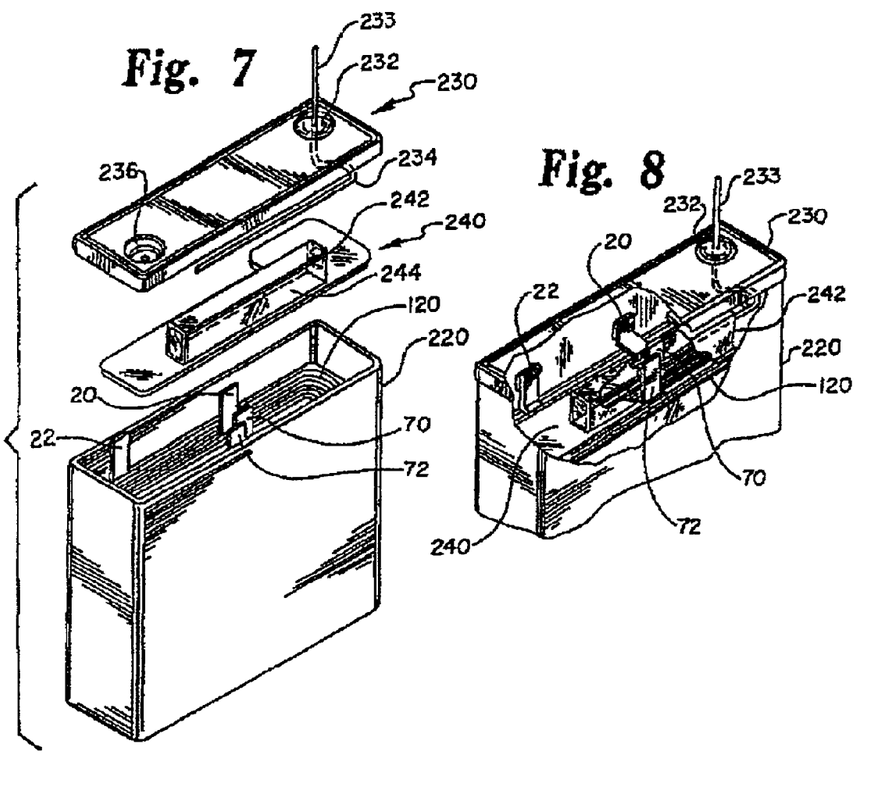
FIG. 7 is an exploded perspective view showing the application of the insulator and case top to the case and electrode assembly shown in FIG. 6.
FIG. 8 is a partially cut-away perspective view of the completed battery showing the connection of the electrode assembly connector tabs with the case elements.

Assembly of the electrode assembly 120 into an exemplary battery is shown in FIGS. 6–8. In FIG. 6, a coil insulator 200 is placed onto the electrode assembly 120. The coil insulator includes a notch 202 to accommodate anode connector tab 22 and slits 204, 206, 208 to accommodate anode connector tab 20, and cathode connector tabs 70, 72 respectively. The electrode assembly 120 is also inserted into an insulating case liner 210. The case liner 210 preferably extends at its top edge above the edge of the electrode assembly 120 in order to provide an overlap with other insulating elements. If so, it may include a notch 211 on one side in order to allow the connection of the anode connector tabs 20, 22 to the case 220, for a case negative battery. The coil insulator 200 and case liner 210 are preferably made from a polyolefin polymer or a fluoropolymer such as PTFE or PCTFE. The electrode assembly 120 and case liner 210 are then inserted into a prismatic case 220, preferably made of stainless steel.

In FIG. 7 a case cover 230 and a pin insulator 240 are shown along with the electrode assembly 120 and prismatic case 220. The case cover 230 has a glassed in feedthrough 232 and feedthrough pin 233 extending through an aperture in the case cover 230 that has a bend 234 which is intended to place the feedthrough 232 in alignment with the cathode connector tabs 70, 72. The case cover 230 also has a fill port 236. Later in the battery assembly process, an appropriate electrolyte solution is introduced through the fill port 236 and the fill port 236 is sealed. The electrolyte solution can be an alkali metal salt in an organic solvent such as a lithium salt (i.e., 1.0M $LiClO_4$ or $LiAsF_6$) in a 50/50 mixture of propylene carbonate and dimethoxyethane. The sealing process may include, for example, making a first seal by pressing a plug into the aperture of the fill port 236 and making a second seal by welding a cap or disc over the fill port 236. Material utilized for leak checking hermetic seals may be included between the first and second seals.

The case cover 230 is made from stainless steel, and the feedthrough pin 233 is preferably niobium or molybdenum. The pin insulator 240 has an aperture 242 leading into a raised portion 244 which receives the feedthrough pin 233 and insulates the feedthrough pin 233 from contact with the case cover 230. In combination with one side of the coil insulator 200, which is immediately below the pin insulator 240, the raised portion forms a chamber, which isolates the cathode connections. Additional insulation in the form of tubing or a coating may also be included on the feedthrough pin 233 and feedthrough 232 at locations that will not be welded to further insulate the feedthrough pin 233 and feedthrough 232. An optional cover insulator could be applied to the underside of the case cover 230 to provide additional insulation for the case cover 230.

The feedthrough pin 233 is welded to the cathode connector tabs 70, 72 as shown in FIG. 8. The anode connector tabs 20 and 22 are welded to the side of the case 220 thereby making the metal case 220 one terminal or contact for the battery (i.e. a case negative design). The feedthrough pin 233 is then inserted through a split in the pin insulator 240 until it projects through the aperture 242 of the pin insulator 240. The electrode assembly 120 may be out of the case 220 during some of the welding and bending operations. The case cover 230 is then welded to the case 220 to seal the electrode assembly 120 in the case. The cathode connections are thoroughly isolated from the portions of the battery at anode potential, and the feedthrough connection is thoroughly isolated from stray particles of material from the cathode and from lithium particles that may form during discharge of the battery.

Thus, an anode-limited electrochemical cell having a narrow lithium tolerance and a method for assembling such a cell have been described. Numerous modifications may be made to the exemplary battery construction described herein that may make use of the present invention. Aspects included in the present invention for constructing a lithium anode may be implemented in any battery requiring a tight tolerance of battery components. As such, the above disclosure should be considered exemplary, rather than limiting, with regard to the following claims.

What is claimed is:

1. A balanced anode assembly for use in a battery electrode, the assembly comprising:
   an elongated piece of a first alkali-metal;
   a second alkali-metal; and
   said first and said second alkali-metal being overlapped to form a narrow strip of cohesive bond region stabilized by a current collector.

2. The assembly of claim 1 wherein said first alkali-metal is thicker than said second alkali-metal.

3. The assembly of claim 1 wherein said first alkali-metal is longer than said second alkali-metal.

4. The assembly of claim 1 wherein said current collector includes a grid or screen made from a conductive metal having corrosion resistant properties when associated with said first and second alkali-metal.

5. The assembly of claim 1 wherein said first and second alkali-metal includes one of lithium metal and an alloy of lithium.

6. The assembly of claim 4 wherein said current collector is selected from a group consisting of titanium, nickel, copper and an alloy of nickel or copper.

7. The assembly of claim 4 wherein at least one connector tab projects from said current collector for connection to a battery terminal.

8. A method for assembling a balanced anode structure, the method comprising:
   laying a first piece of alkali-metal over a second piece of alkali-metal;
   forming a cohesive bond between said first and second piece;
   laying a current collector over said first piece; and
   pressing said current collector to form a cohesive bond.

9. The method of claim 8 wherein said method of laying a first piece of alkali-metal includes selecting an elongated piece of alkali-metal.

10. The method of claim 8 wherein said method of laying a second piece of alkali-metal includes selecting a thinner piece of alkali-metal than said first piece.

11. The method of claim 8 wherein said method of pressing includes sandwiching said first piece between said collector and said second piece.

12. The method of claim 11 wherein said method of sandwiching includes supporting and stabilizing said first piece and said second piece by said current collector.

13. A method for assembling anode and cathode subassemblies to form an electrode assembly comprising:
   preparing an anode subassembly;
   preparing a cathode subassembly; and
   winding said anode subassembly with said cathode subassembly to form the electrode assembly wherein said anode subassembly alkali-metal being overlapped to form a narrow strip defining a cohesive bond region stabilized by a portion of a metallic current collector.

14. The method according to claim 13 wherein said method of preparing a cathode subassembly includes providing a cathode material pressed against a current collector wherein said current collector includes a corrosion resistant metal at the cathode potential.

15. A system for balancing a battery to substantially equalize end of discharge with a start of a second voltage plateau comprising:
   means for avoiding discharge in a region of increased resistance; and
   means for balancing the battery such that the end of discharge is approximately the start of the second voltage plateau, wherein said means for avoiding discharge includes means for reducing potential swelling, wherein said means for reducing potential swelling includes reducing an excess amount of an anode material present inside the battery.

16. A system according to claim 15, wherein the anode material comprises a lithium material.

17. A system according to claim 15, wherein means for reducing potential swelling includes one of maintaining a narrow tolerance for the anode dimensions and the anode mass.

18. A system according to claim 15, wherein means for reducing potential swelling includes disposing a relatively thin foil layer of anode material in an outer turn of a coiled anode member, said foil layer having dimensions calculated so that an immediately adjacent portion of a cathode material depletes substantially at the same time as the foil layer of anode material.

19. A system according to claim 18, wherein relatively thin foil layer of anode material comprises a lithium material.

* * * * *